United States Patent
Call et al.

[11] Patent Number: 5,216,659
[45] Date of Patent: Jun. 1, 1993

[54] LASER POWER CALIBRATION BY MEASURING LASER DRIVE CURRENT AT OUT OF FOCUS AND IN FOCUS CONDITIONS

[75] Inventors: David E. Call; Julian Lewkowicz, both of Tucson, Ariz.

[73] Assignee: International Business Machines, Armonk, N.Y.

[21] Appl. No.: 757,748

[22] Filed: Sep. 11, 1991

[51] Int. Cl.$^5$ .............................................. G11B 7/125
[52] U.S. Cl. .................... 369/116; 369/44.27
[58] Field of Search .................. 369/116, 122, 13, 54, 369/106, 44.27; 250/205

[56] References Cited

U.S. PATENT DOCUMENTS

| | | | |
|---|---|---|---|
| 4,785,443 | 11/1988 | Minami et al. | 369/116 |
| 4,832,487 | 5/1989 | Mikuriya et al. | 356/243 |
| 4,858,219 | 8/1989 | Yoshikawa et al. | 369/116 |
| 4,894,817 | 1/1990 | Tanaka et al. | 369/54 |
| 4,907,212 | 3/1990 | Pharris et al. | 369/45 |
| 4,935,912 | 6/1990 | Hirano et al. | 369/44.11 |
| 4,937,440 | 6/1990 | Hofer et al. | 250/201.5 |
| 4,937,799 | 6/1990 | Hashimoto et al. | 369/13 |
| 4,949,329 | 8/1990 | Furman et al. | 369/116 |
| 5,050,156 | 9/1991 | Barton | 369/116 |
| 5,070,495 | 12/1991 | Bletscher, Jr. et al. | 369/116 |
| 5,136,569 | 8/1992 | Fennema et al. | 369/58 |

Primary Examiner—Paul M. Dzierzynski
Assistant Examiner—Jim Beyer
Attorney, Agent, or Firm—Greenlee and Winner

[57] ABSTRACT

Apparatus and method for calibrating the drive current circuit of a semiconductor laser diode subject to reflected optical feedback from a target surface such an an optical recording disk. The method makes use of two power output vs. drive current characteristic curves for the laser, one curve for in focus condition and one for out of focus condition, wherein the curves exhibit an asymptotic region at high power levels ($P_2$). Measurement of drive current ($I_2$) power level $P_2$ is taken under an out of focus condition. Measurements of drive current at a predetermined low power level $P_1$ are taken for both ($I_1$) and in focus condition ($I_3$). The linear slope of the in focus curve can thus be calculated to set desired power levels.

17 Claims, 4 Drawing Sheets

LASER POWER CALIBRATION BY MEASURING LASER DRIVE CURRENT AT OUT OF FOCUS AND IN FOCUS CONDITIONS

This invention relates to optical disk apparatus and more particularly to the calibration of laser current in an apparatus capable of utilizing both magnetooptical (MO) and write-once (WORM) media.

RELATED PATENT APPLICATION

Ser. No. 07/555,952 entitled, "Calibrating and Power Protecting Laser Drive Circuits" relates to a calibration technique for magnetooptic (MO) media, that is, erasable media.

BACKGROUND OF THE INVENTION

Optical disk devices are used for the storage of computer prepared data and have recognized value in their ability to store large quantities of data. The media for use in such devices is reactive to bursts of light such as may be produced by the rapid switching of a semiconductor laser. In order to write data on optical media, the laser power must be controlled at a fairly high power level in order that the media can be altered to reflect the presence or absence of data. In reading the data back, the laser power level is controlled to a lower level so that the media is not altered by the laser beam.

Optical media is of two general types. That is, media which can be written only once and media which can be written, erased and written again. Write once media (WORM) is permanently altered when "write" power levels are produced by the laser beam while erasable media such as magnetooptic (MO) media is not permanently altered when data is written. In the MO media, the magnetic orientation of the reactive material is altered in the writing process and in the erasing process the magnetic orientation is reordered.

In operating an optical disk system it is necessary to set the correct laser power level to read and to write for each optical disk. The correct parameters for the optical disk are included in information in an identification header stamped onto the disk itself. That information, when read by the system, enables a calibration circuit to set the desired current levels for the laser to produce correct laser power. Since the laser is subject to unintended changes in its operating parameters particularly with temperature and aging, the calibration method is also used to change current levels for the laser so that the correct power level is maintained under operating conditions and throughout laser life.

The common practice of calibrating the laser circuits to operate with a given optical medium usually involves analyzing the laser light intensity at the optical medium. To do that, the laser control circuits are set to match a predetermined or desired light intensity at the optical medium. Analysis is conducted to enable setting digital to analog converters (DAC) for controlling laser power in the writing, and the erasing operations of optical mediums. With a WORM media, the high light intensities needed to calibrate the circuit might write on the disk and thereby cause permanent alteration of the media during the calibration process. Therefore, it has become common practice to calibrate WORM media with the laser beam out of focus at high power levels in order to calibrate without permanent alteration of the media. It is possible to use out of focus conditions since the optical path for WORM media is designed to eliminate light feedback reflected from the optical disk. With MO media, the common practice is to calibrate the system under in focus conditions in order to obtain accurate power levels since optical feedback cannot be eliminated from the optical path. One of the effects of such feedback is a change in the laser power versus bias current curve (P-I curve), and, therefore, calibration should take place under in focus conditions.

The inventors herein have sought to provide an optical disk apparatus capable of recording and reading both write once media and erasable media. In order to do that, the apparatus must provide a calibration technique which can be used on both types of media. For MO media, the power level for the "write" DAC calibration could be performed with the laser beam in focus. However, with WORM media, the "write" DAC power level cannot be calibrated with the laser beam in focus since permanent alteration of the media would result.

The above referenced patent application provides a digital to analog converter to control the output light intensity of a laser diode such as for recording signals on an optical disk. The laser power is calibrated by initially setting the DAC to supply two predetermined laser power levels, one a high level and one a low level. That is accomplished by increasing the numerical input to the DAC until beam intensity reaches values at predetermined laser power levels. A calculation in a microprocessor subtracts the lower power value from the higher power value, then divides the number (DAC setting) between the two power levels to obtain a DAC efficiency which is a laser output power level change per DAC unit value input change. The desired DAC settings for producing desired power levels are then determined. That calibration technique was designed for use with MO media and called for the application of power at a low level and at a high level in order to determine the linear slope of the P-I curve. Utilizing that technique with WORM media would destroy the media at the high power level.

U.S. Pat. No. 4,785,443 describes an optical disk system and laser light control circuit for WORM disk media. The "write" laser power calibration is performed with the media out of focus in order to protect the storage media from permanent alteration.

SUMMARY OF THE INVENTION

This invention is a calibration technique and apparatus for establishing the correct power levels with which to drive a semiconductor laser at power levels that are safe for write once media in the presence of optical feedback so that either erasable or write once media can be utilized. The inventors have noted that at very high power levels the in focus and out of focus P-I curves approach each other and therefore the difference in current between the in focus and out of focus condition is small. As a result, a high power level is chosen to implement the invention at a level where the difference in current is small. In that manner a calibration technique is presented which enables the use of a high power level to calibrate the laser at an out of focus condition regardless of the type of media located in the disk drive.

In the invention, the objective lens is moved to an out of focus condition and a first predetermined low power level is attained; the current level and DAC setting are recorded. Next, the power is increased to a second predetermined high power level where in focus and out of focus P-I curves are asymptotic; the current level and DAC setting are recorded. Next, the power level is dropped to approximately the first predetermined level and the objective lens is moved so that the laser beam is in focus. The power level is adjusted to the first predetermined power level and the current level and DAC setting are recorded. In that manner, the slope of the in focus and the slope of the out of focus curves are determined. With that information, any particular power level, for example, a "write" power level which might be half way between the high and low calibration levels can be accurately set.

DETAILED DESCRIPTION

Figure 1:
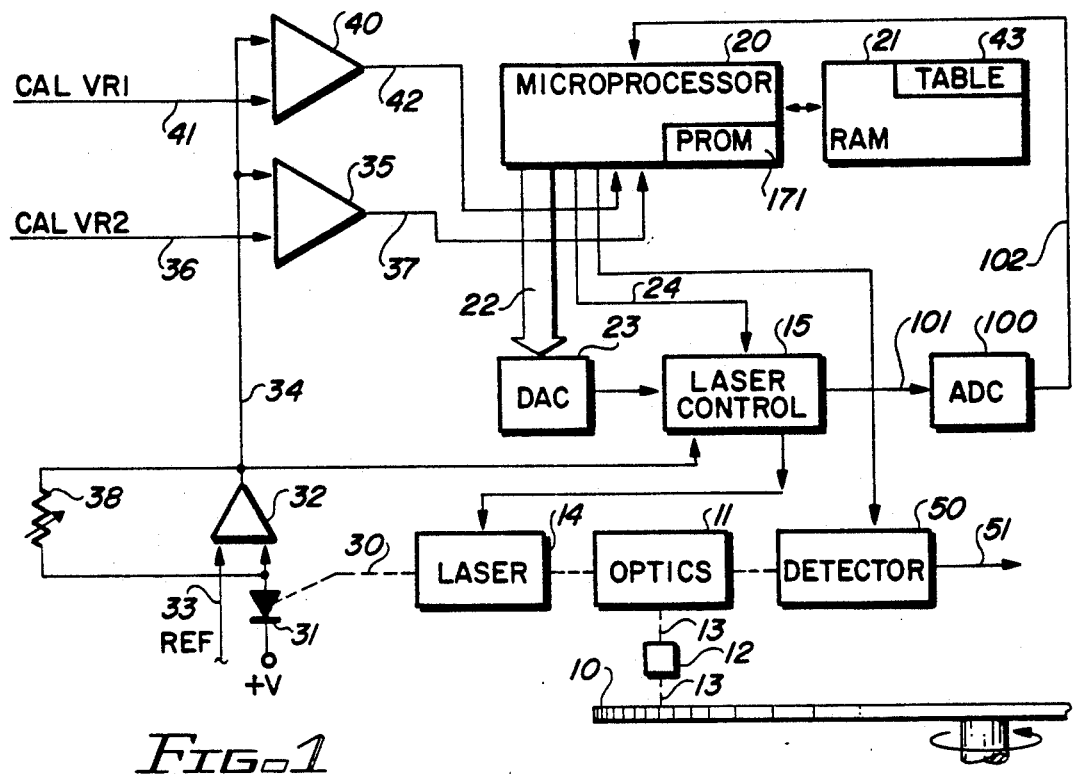
FIG. 1 is a block diagrammatic showing of an optical disk recorder employing the present invention.

Referring now more particularly to the appended drawing, like numerals indicate like parts and structural features in the various figures. An optical disk 10 is suitably mounted for rotation in an optical disk recorder (mechanical details not shown). In FIG. 1, an optical system 11 which includes the usual beam splitters, and the like, supplies a light beam generated by laser 14 through objective lens 12 over light path 13 and receives reflected light from disk 10 over the same path and objective lens 12. The light beam is directed through optics 11 to disk 10 as controlled by laser control 15, as later detailed in FIG. 2. The FIG. 1 illustrated recorder-player is under control of a programmed microprocessor 20 which has a random access memory (RAM) 21. Microprocessor 20 supplies a digital value over cable 22 to digital to analog converter (DAC) 23. DAC 23 supplies an analog signal to laser control 15 for setting the beam intensity emitted by laser 14 to optics 11. Such laser output light intensity includes modulation based upon data as supplied by microprocessor 20, or other data handling circuits. Line 24, extending from microprocessor 20 to laser control 15, signifies additional mode control for controlling the laser control circuits 15.

Laser 14 is controlled in intensity by a feedback circuit in laser control 15. Laser 14 emits an auxiliary beam over light path 30 to a photo diode 31 which also receives reflected light from optics 11. Photo diode 31 varies the photo current amplitude in accordance with the laser 14 emitted light over path 30, including feedback, as is known. If desired, the main beam may be used to illuminate photo diode 31 by passing the beam through appropriate optical components including beam splitters. Transimpedance amplifier 32 responds to the diode 31 changed current amplitude compared with a reference value on line 33 to supply signals over line 34 indicative of laser 14 output beam intensity. Potentiometer 38 adjusts the gain of the transimpedance amplifier. This adjustment effects a calibrated signal level on line 34 in volts per watts. As a result, the signal level on line 34 represents the light power output of laser 14. Laser control 15, under normal operations, responds to the signal level on line 34 to maintain the laser 14 operation at predetermined intensity values, as is known.

Additional circuits are provided for processing the line 34 signal for enabling automatic calibration of DAC 23 such that numerical values on cable 22 accurately represent a desired light intensity output of laser 14. DAC 23 is calibrated based upon laser 14 intensity at a minimal or safe power level $P_1$ and a high power level $P_2$.

A first analog comparator 40 receives the line 34 signal at one input for receiving an indication of the laser 14 output light intensity. On line 41 is a reference value indicative of the desired minimal or safe value CAL VR1 which is a voltage level corresponding to first predetermined power level, $P_1$. Comparator 40 supplies an inactive signal over line 42 to microprocessor 20 at all times until the signal on line 34 indicates that laser 14 is emitting a light beam equal to or greater than the minimal value. At this time comparator 40 supplies an active signal over line 42 to microprocessor 20. Microprocessor 20 then stores the DAC 23 input value in table 43 for later calculating values to be used in controlling laser 14.

An analog to digital converter (ADC) 100 is connected over line 101 to laser control circuit 15 and over line 102 to microprocessor 20. ADC 100 measures the drive current for laser 14, that is, the output current of laser control circuit 15. When the predetermined power level $P_1$ is reached and the corresponding DAC 23 setting is recorded in table 43, the digitized output of ADC 100 representing the drive current for power level $P_1$ at an out of focus condition is also recorded in table 43.

The microprocessor 20 programming, as later described, continuously increases the numerical value over cable 22 to thereby cause DAC 23 to actuate laser 14 to ever increasing power levels for increasing output light intensities. This repetitive step by step increasing continues until comparator 35, constructed in the same way as comparator 40, detects a signal on line 34 at its first input which is greater in amplitude than the reference signal, CAL VR2, on line 36 representing a maximal power level $P_2$, producing a desired reference output light intensity of laser 14. Comparator 35 when sensing the line 34 signal being less than the reference signal on line 36 supplies an inactive signal over line 37 to microprocessor 20. As soon as comparator 35 determines that the line 34 signal exceeds the reference signal on line 36, then an active signal is supplied over line 37 to microprocessor 20, whereupon microprocessor 20 stores that DAC 23 input value in table 43. At this point, microprocessor 20 also records the digitized output of ADC 100 representing the drive current producing power level $P_2$.

After dropping the power level back to a level somewhat below level $P_1$, the objective lens is moved to bring the laser beam into focus at the surface of optical media 10. Comparator 40 receives the line 34 signal for receiving an indication of laser 14 intensity. The DAC 23 setting is increased until the line 34 signal matches the CAL VR1 signal which produces the first predetermined power level, $P_1$. At this point, the DAC 23 setting is recorded in table 43 as is the ADC 100 output representing the laser drive current needed to produce power level $P_1$ at the in focus condition.

Figure 2:
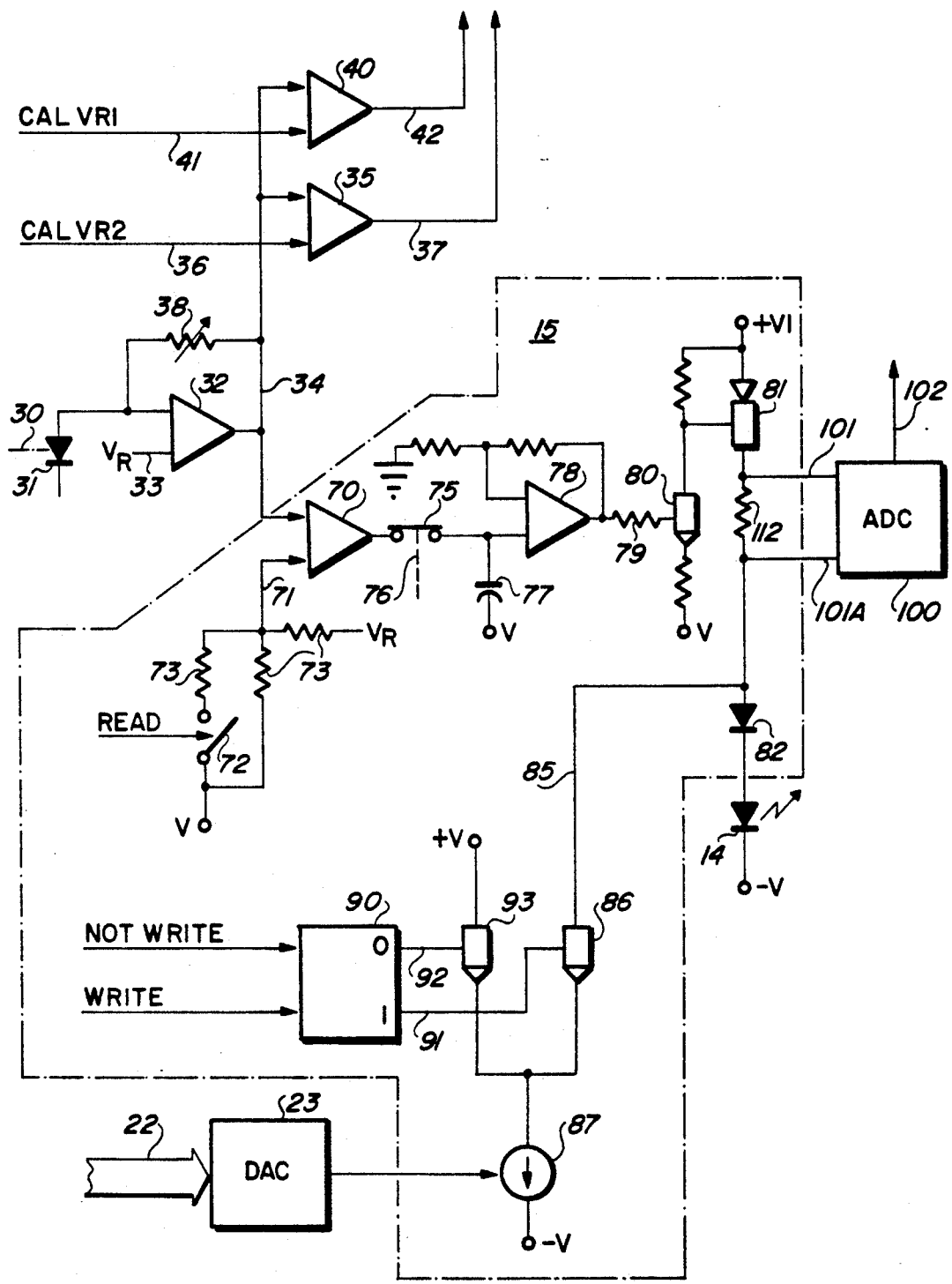
FIG. 2 is a diagram showing the laser control circuit for the recorder of FIG. 1.

Referring next to FIG. 2, the details of laser control 15 are shown. In laser control 15 amplifier 70 receives a signal from line 34. A reference input at line 71 controls amplifier 70 during read operations. Resistor network 73 is coupled to reference voltages with the bias supplied to amplifier 70 over line 71 being varied by the read switch 72. The signal voltage amplitude difference between the line 34 and line 71 signals is the voltage error output between a desired read laser power level and the actual laser output power level. Amplifier 70 amplifies this error voltage and supplies it through control switch 75 as closed via the signal from microprocessor 20 received over line 76. Switch 75 is closed for read operations. Capacitor 77 smooths the signal received from amplifier 70 and acts as a sample and hold capacitor when switch 75 is open. A second amplifier 78 buffers and amplifies the error signal for passing it through resistor 79 to a controlling transistor 80, which acts as a current control for a second transistor 81 which has its base connected to the collector of transistor 80. Transistor 81 supplies a drive current from a reference source $+V1$ which flows through resistor 112, voltage shifting diode 82 thence to laser diode 14 for causing emission of light. Voltage across resistor 112 acts to sense the value of the drive current which is then converted by ADC 100 to a representative digital value. The drive current value flowing through transistor 81 is the total value for the mode involved; for recording this means a recording level of current flowing through laser diode 14 for actuating it to emit an output light having a power level for recording on a record medium. Between the writing impulses i.e., the record zeros or no change in the record medium, the current from transistor 81 is partially diverted through a transistor 86 to current sink 87. The value of current through current sink 87 is controlled by DAC 23, therefore controlling the laser 14 emission. A write data signal is supplied to switch 90, shown as a flip-flop. A transistor turn-off signal supplied over line 91 makes transistor 86 non-conductive. This action forces the current from transistor 81 to flow through the laser diode 14 for "causing maximum emission of radiation or maximum light output." Simultaneously, the line 92 from the flip-flop 90 switches transistor 93 to current conduction for replacing the current in current sink 87 previously supplied by transistor 86. The result is recording binary ones on the record medium 10. When a not write signal is being supplied to flip-flop 90, the current conduction of transistors 86 and 93 is reversed for diverting current from transistor 81 to reduce the emission of radiation or light from laser 14.

During reading operations, switch 75 being closed, a laser 14 control loop exists such that the line 34 signal (representing emitted laser light power) matches the line 71 signal (desired read laser output power level). Each time microprocessor 20 changes the DAC 23 input value, it closes switch 75 and sets flip-flop 90. Then transistor 86 becomes current conductive. This action changes the current amplitude in current sink 87 such that the amount of current being diverted from transistor 81 is also changed. Upon each change of input value to DAC 23, a time delay is required to allow the laser control servo loop described above to reach an equilibrium operating point. During this time delay, the change in current flowing through transistor 81 is allowed to stabilize. During recording or erasing modes, switch 75 is kept open to prevent the above described servo action from changing the laser drive current during recording or erasing.

Comparators 35 and 40 are used for calibrating the DAC 23. During the calibration phase at the predetermined low power level $P_1$, voltage CAL VR1 is supplied over line 41 to comparator 40 for detecting the lower power laser output. During calibration at the predetermined high power level $P_2$, voltage CAL VR2 is supplied over line 36 to comparator 35 for detecting the higher power laser output level.

Figure 3:
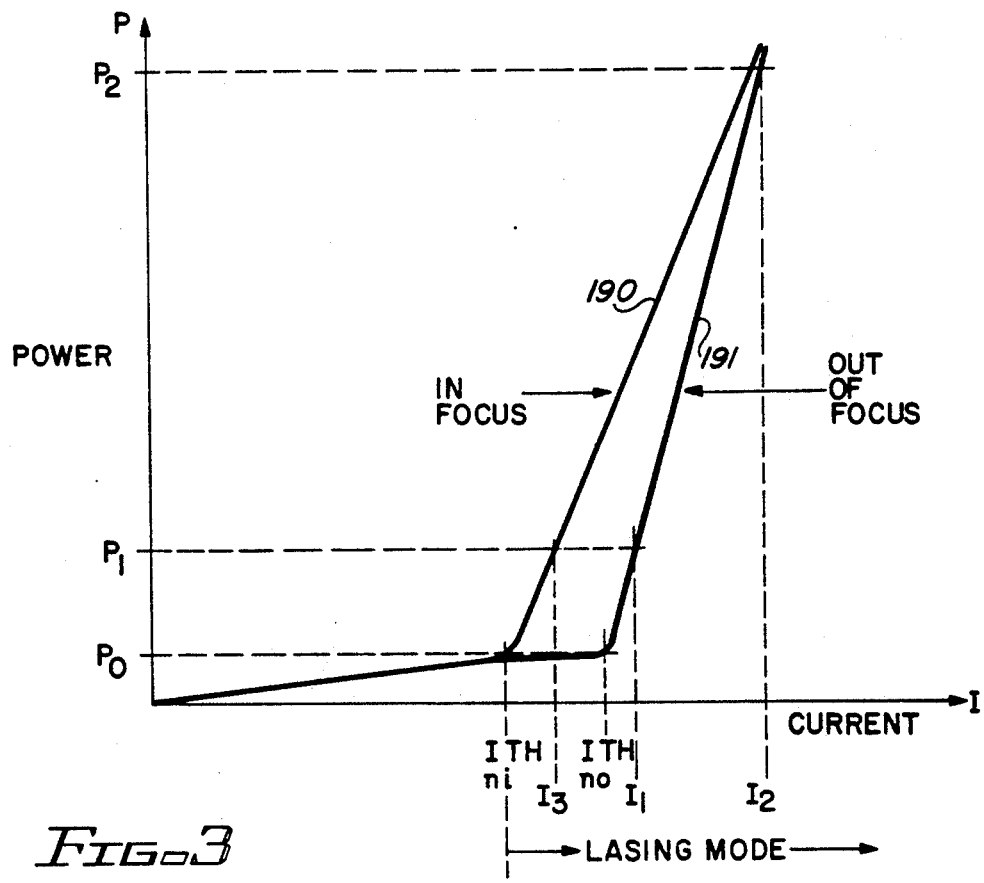
FIG. 3 is a diagram of the P-I curve for in focus and out of focus conditions.

FIG. 3 shows two power-current characteristic curves for a semiconductor laser. Curve 190 is produced for an in focus condition showing the power levels produced at corresponding current levels. Curve 191 is produced for a maximum out of focus condition showing the power levels produced at corresponding current levels. The power level P0 represents that threshold power level at which lasing mode is achieved. The corresponding threshold current level is designated ITHni for the in focus condition and ITHno for the maximum out of focus condition. A low reference power level, P1, is chosen such that write-once media will not be altered when the lens is in focus. A high reference power level P2 is chosen such that the difference in laser current to produce P2 is small between in focus and maximum out of focus conditions. Note that the characteristic curves 190 and 191 approach asymptotically at high power levels.

The invention uses the fact that at high laser power, the difference in laser power, for a given laser bias current, is small whether the laser beam is in or out of focus. The calibration operation of this invention finds the change in laser DAC value $\Delta DAC2$, that is required to produce a change in laser power from a first low reference power level, P1, to a second high reference power level P2, while the laser beam is out of focus. Also, the change in laser DAC value, called $\Delta DAC1$, is found that is required to change the laser bias current from the low $P_1$ power level with the laser beam in focus to the $P_1$ power level with the laser beam out of focus. The $P_1$ power level is a low or safe laser power level for WORM media when the laser beam is in focus on the media. The laser DAC transfer function E is then calculated as the change in laser power (P2–P1), divided by the sum of the change in DAC value ($\Delta DAC1 + \Delta DAC2$).

Figure 4:
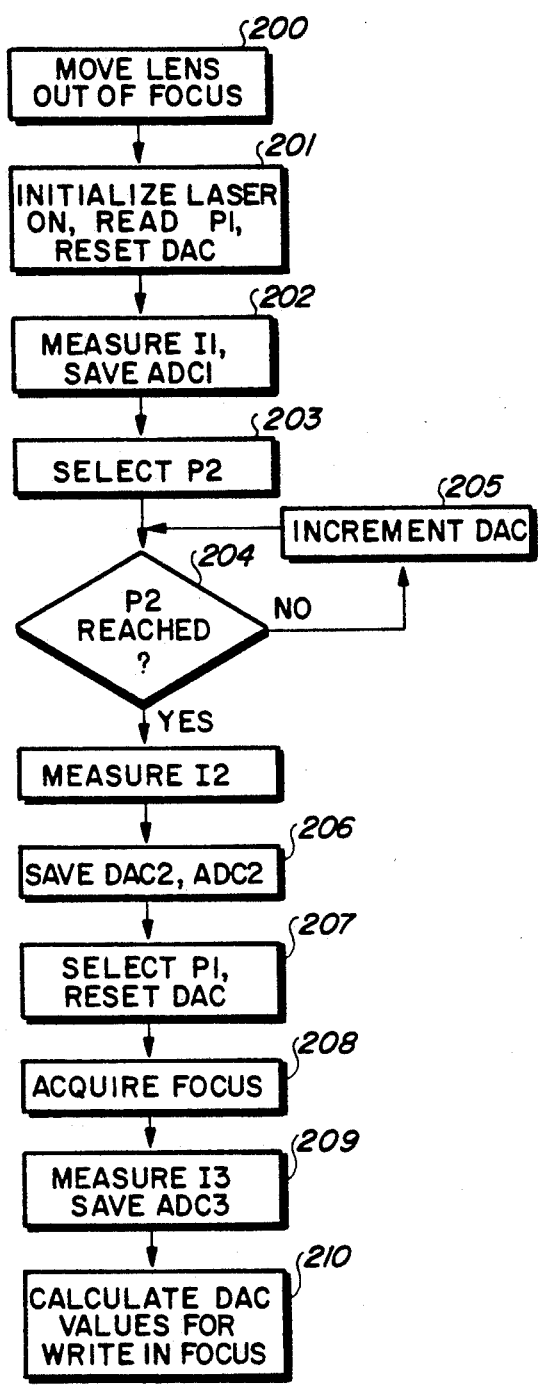
FIG. 4 is a simplified flowchart of a machine operation showing the power values to calculate corresponding DAC values for calibrating optical media in accordance with the invention.
Figure 5:
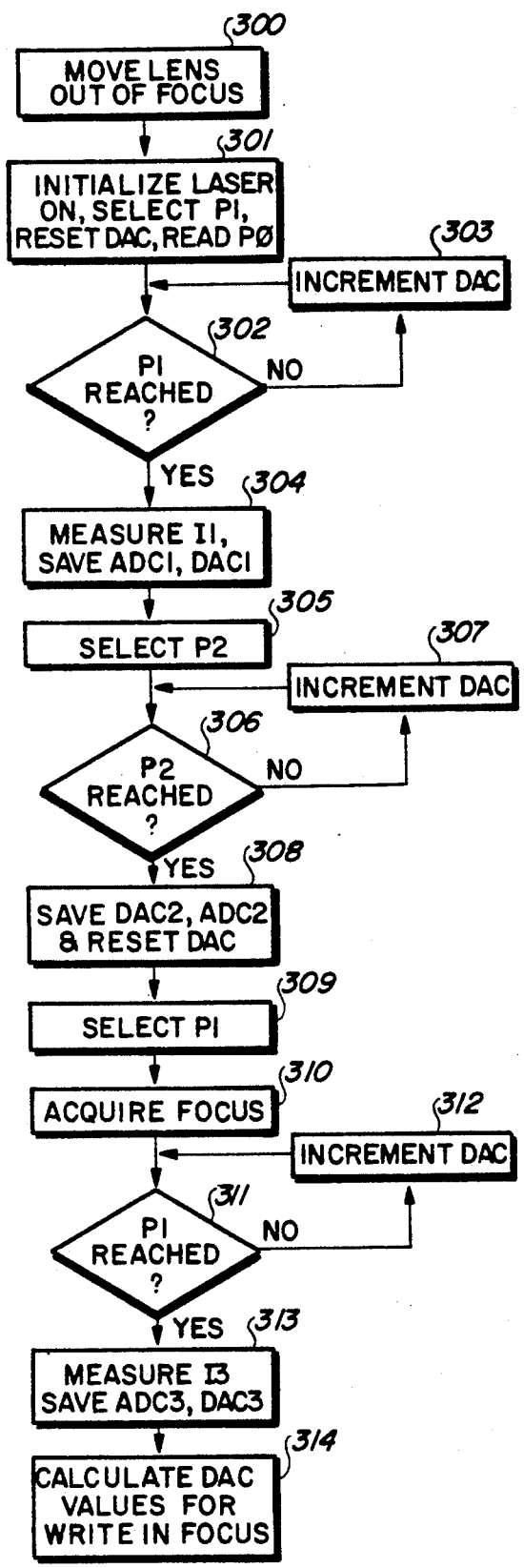
FIG. 5 is a generalized flowchart of machine operation for the incorporation of the instant invention.

FIG. 4 shows a flow chart of machine operations where it is assumed that P1=P0, and that DAC1=0 at P0. FIG. 5 describes the more generalized case where these assumptions are not made. FIG. 4 can be better understood by referring to the P-I curve in FIG. 3. At step 200 the objective lens is moved away from the media to a maximum out of focus condition before the laser is turned on. In step 201, the laser is turned on with the DAC set to zero, laser power control loop (LPCL) closed by closing switch 75 and with write data set inactive, thus producing the laser power level P1. In step 202, the laser drive current is then measured with ADC 100 and saved as ADC1. Next (steps 203 through 205), the DAC value is incremented with switch 75 closed and write data inactive. The switch 75 is the open write data is set active and power is measured. The process is repeated until the DAC value is found that is required to obtain P2 and that DAC value is stored as DAC2. The laser current is again measured with the ADC 100 and saved as ADC2. Then the LPCL is closed and the DAC is reset which returns the laser power level to $P_1$, as shown at step 207. Thereafter, the laser beam is put into focus on the media at step 208 and the laser bias current is measured with the ADC 100 and saved as ADC3 in step 209. At this point, calculations are all that remain of the DAC calibration procedure, and these are performed in the microprocessor 20 at step 210.

In step 210 calculations, the change in laser DAC value is found that is required to change the laser drive current from P1 with the laser beam in focus to P1 with the laser beam out of focus as ΔDAC1 in equal 1.

$$\Delta DAC1 = \Delta DAC2 \times (ADC1 - ADC3)/(ADC2 - ADC1) \quad (1)$$

The DAC transfer function $$\left(\frac{mW}{DAC\ step}\right)$$

is calculated as E, as shown in Equation 2.

$$E = (P2 - P1)/(\Delta DAC2 + \Delta DAC1) \quad (2)$$

The DAC value, DACn, can be calculated for any laser power level P1p as shown in equation 3. Also the laser power can be found for any DAC value, DACn, as shown in equation 4.

$$DACn = (P1p - P1)/E \quad (3)$$

$$P1p = P1 + E \times DACn \quad (4)$$

FIG. 5 is a more generalized flow chart of the new calibration method which does not assume P1=P0 and where the DAC setting is not necessarily equal to zero at P1. At step 300, the objective lens is moved to a maximum out of focus condition and initializing operations are carried out at step 301 to turn the laser on, reset the DAC, and establish read power level $P_0$ with switch 75 closed and write data inactive. Thereafter, the DAC is incremented with switch 75 closed and write data inactive. Then switch 75 is open and write data is set active to measure the power level. The process repeats until the power level P1 is reached, as shown at steps 302 through 303. At step 304, the laser drive current for producing power level $P_1$ is measured, converted to a digital value by ADC 100 and saved as ADC1. Thereafter, the DAC is incremented and power measured in the fashion described above until power level $P_2$ is reached (steps 306 through 308). The DAC setting is stored as DAC2 and laser drive current is measured and stored as ADC2. The DAC is 12 then reset, step 308, and power level $P_0$ is again established. Power level $P_1$ is targeted as a search value at step 309. Focus is acquired at step 310 and the DAC is incremented in the fashion described above until power level $P_1$ is reached (steps 311 and 312). The DAC setting is stored as DAC3 and the drive current is measured and stored as ADC3 (step 313). The above equations 1-4 are modified as equations 5-8 respectively and the microprocessor performs the calculations (step 314).

$$\Delta DAC1 = (DAC2 - DAC1) \times ((ADC1 - ADC3)/(ADC2 - ADC1)) \quad (5)$$

$$E = (P2 - P1)/((DAC2 - DAC1) \quad (6)$$

$$DACn = DAC3 + (P1p - P1)/E \quad (7)$$

$$P1p = P1 + E(DACn - DAC3) \quad (8)$$

Figure 6:
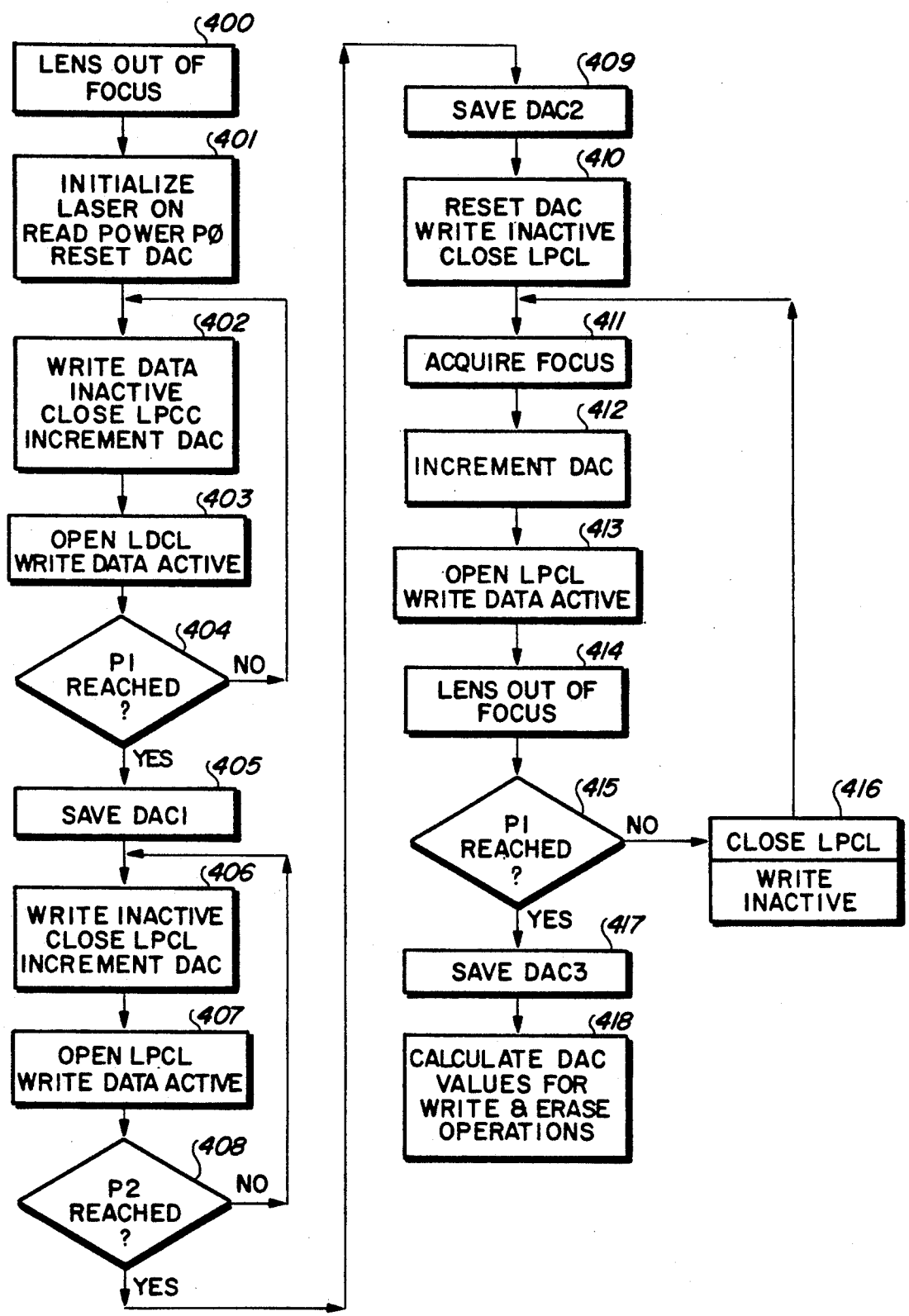
FIG. 6 is a flowchart of an alternative operation.

An alternative method of calibrating the laser is given in FIG. 6. This method does not require the use of an ADC and makes use of the linear nature of the laser P-I characteristic curve as shown in FIG. 3. DAC settings are saved for each power level $P_1$ and $P_2$ as before, and these numbers are used to represent drive current. At step 400, the lens is moved out of focus and the system initialized at step 401. The DAC is incremented until target power level $P_1$ is reached (steps 402 through 404) and the DAC setting DAC1 is saved (step 405). At steps 406 through 408 power $P_2$ is reached and the DAC setting DAC2 is saved (step 409). At step 410 the DAC is reset and the read power level $P_0$ is established by closing the laser power control loop (LPCL) by closing switch 75. Focus is acquired at step 411. Next, in steps 412 through 417 the DAC3 value is found. At step 418 the DAC transfer function E is calculated using expression 9 shown below where ΔDAC1=DAC2−DAC1 and ΔDAC2=DAC3−DAC1.

$$E = (P2 - P1)/(\Delta DAC1 + \Delta DAC2) \quad (9)$$

In practicing this invention, it will not be known whether MO or WORM media is inserted into the drive until after the control tracks are read. Therefore, the erase/write DAC calibration should be performed with the laser beam out of focus. If MO media is in the drive, the DAC calibration results are still valid.

With the above invention, additional checking of the laser drive circuit can be performed.

In prior art, the laser DAC transfer function has been calculated and used for checking of the laser power control system. The units of the DAC transfer function, E, are mW/DAC step. In the system described herein, by monitoring the laser bias current with the ADC, another transfer function is calculated. This is called the ADC transfer function, n, with units of mW/ADC step since the change in ADC value is found that is required to produce a predetermined change in laser power. The equations to calculate the ADC transfer function are shown below for both out of focus (no) and in focus (ni) conditions.

$$no = \frac{P2 - P1}{ADC2 - ADC1} \quad (10)$$

$$ni = \frac{P2 - P1}{(ADC2 - ADC1) + (ADC2 - ADC3)} \quad (11)$$

The transfer functions no and ni can be rewritten as the laser efficiency Ga in units of mW/mA, divided by the current-to-voltage converter, gain $K_1$ in units of V/mA, and the ADC 100 conversion factor $K_2$ in units of ADC steps N. This is shown below in equation 12.

$$n = \frac{Ga}{K_1 K_2} \quad (12)$$

From the circuit implementation, if the current-to-voltage converter gain $K_1$, and ADC conversion factor $K_2$ are known, the laser efficiency Ga can be calculated in units of mW/mA as follows.

$$Ga = n K_1 K_2 \quad (13)$$

In like manner, the laser efficiency Gd can be estimated from the DAC transfer function E if the DAC conversion rate $K_3$ in units of mA/DAC step is known.

$$Gd \; E/K_3 \quad (14)$$

From the DAC calibration, since both the DAC transfer function E, and ADC transfer function n, are found, the laser efficiency in units of mW/mA can be calculated from both equations 13 and 14 and the results compared to each other and against absolute limits. If the two efficiency calculations are the same but are out of the specified range, a fault is indicated in the laser diode. If the two efficiencies are not equal, a fault is indicated in the laser drive circuit.

In addition, by comparing the results of the two efficiency calculations against each other, many other circuit functions in the laser driver and the current sensing elements can be checked such as the current-to-voltage converter gain $K_1$, the ADC conversion factor $K_2$, and the DAC conversion rate $K_3$. Assuming that the two laser efficiencies, Ga and Gd are equal, the relationship between the ADC transfer function, n, and the laser DAC transfer function E is shown in equation 15. The DAC/ADC rate, DAC steps per ADC steps is the reciprocal of the product of the DAC conversion rate $K_3$ (mA/DAC), the current sense to voltage rate $K_1$ (V/mA), and the ADC conversion rate $K_2$. These K factor quantities are controlled with the circuit design and should remain stable over time, thus limits can be established on the DAC to ADC conversion (DAC/ADC) rate. By placing limits on the DAC/ADC rate, the function of several circuit elements can be checked; the DAC conversion rate $K_3$ (mA/DAC), the voltage to current sense rate $K_1$ (V/mA), and the ADC conversion rate $K_2$ (ADC/V).

$$DAC/ADC = n/E = 1 \times (K_1 K_1 K_2 K_3) \quad (15)$$

The relationship between ADC values and the laser current (ADC/mA) is established as shown in equation 16. These quantities are a subset of equation 15, thus also remain stable over time. Reasonable limits are established on the ADC to laser bias current (ADC/mA) conversion rate to check the ADC and laser functions.

$$ADC/mA = K_1 K_2 \quad (16)$$

By monitoring the laser bias current with the ADC, additional checking can be performed on the laser power control system. When a command is given to change the laser DAC it can be verified that the DAC did change since the relationship is known (Equation 16). Also a check can be made on the laser threshold current (or the laser bias current at some power level), when the laser is turned on or when a potential fault is present since the relationship between ADC value and laser bias current (ADC/mA) is known (Equation 16).

Following is an example of how the laser bias threshold current is measured. Before the laser is turned on, the bias current is measured with the ADC. This is called an offset value. The laser is then turned on at some power level, for example, 0.5 mW and the laser bias current is then measured with the ADC with the offset term subtracted. If a limit is established on the maximum laser bias current at this power level, ie, 80 mA in this example, and the ADC to laser bias current conversion rate is known to be 1.5 ADC bits per mA, a limit on the measured ADC value can be established, for example, 120 steps. If the ADC value is exceeded, the laser power control system or laser diode is faulty.

Several other possibilities exist with the ability to measure the laser bias current with an ADC. Some of these are as follows. By sampling the laser bias current with the ADC before the process of bringing the object lens in focus with the media, it can be verified that focus has been acquired since the laser bias current will decrease because of light being fed back into the laser cavity. Also during the focus acquire process, by monitoring the bias current with the ADC, it can be detected when the objective lens is coming into focus. This is an alternative method to detecting the Focus Error Signal (FES) peak as is the present method. Also by monitoring the laser bias current with the ADC while adjusting the FES offset, the point of minimum laser bias current will suggest optimum focus since the laser feedback will be a maximum.

While the invention has been particularly shown and described with reference to preferred embodiments thereof, it will be understood by those skilled in the art that various changes in form and details may be made therein without departing from the spirit and scope of the invention:

What is claimed is:

1. A method for calibrating apparatus employing semiconductor laser diodes subject to reflective optical feedback from a target surface wherein the power output vs. drive current characteristic curves for the laser diode exhibit an asymptotic region for in focus and out of focus conditions at high power levels, the machine-implemented method comprising the steps of:

establishing an out of focus condition on said target surface, energizing said laser diode to produce a predetermined first lower laser power level ($P_1$) and measuring the laser drive current ($I_1$) needed to produce said low power level at said out of focus condition, energizing said laser diode to produce a predetermined high laser power level ($P_2$), said high level selected within the asymptotic region, and measuring the laser drive current ($I_2$) needed to produce said high level, energizing said laser diode to produce said first low power level $P_1$, establishing an in focus condition on said target surface, measuring the laser drive current ($I_3$) needed to produce said first low power level at said in focus condition and determining the slope of said power vs. current characteristic curve for in focus conditions utilizing the relationship $$\frac{P_2 - P_1}{I_2 - I_3},$$

whereby the current needed to establish any power setting between $P_1$ and $P_2$ can be calculated from said slope thereby providing said calibration for in focus condition.

2. The method of claim 1 further including the step of determining the slope of said power vs. current characteristic curve for out of focus conditions utilizing the relationship $$\frac{P_2 - P_1}{I_2 - I_1},$$

whereby the current needed to establish any power setting between $P_1$ and $P_2$ can be calculated thereby providing said calibration for said out of focus condition.

3. A method for calibrating apparatus employing semiconductor laser diodes subject to reflective optical feedback from a target surface wherein the power output vs. drive current characteristic curves for the laser diode exhibit an asymptotic region for in focus and out of focus conditions at high power levels, and wherein said apparatus includes laser drive circuitry with a digital to analog converter (DAC) for setting drive current levels and includes an analog to digital converter (ADC) for measuring drive current levels, said method comprising the machine-implemented steps of:

establishing an out of focus condition on said target surface, energizing said laser diode to produce a predetermined first low laser power level ($P_1$), saving the DAC setting (DAC1) and the ADC setting (ADC1) at said $P_1$ power level for said out of focus condition, energizing said laser diode to produce a predetermined high laser power level ($P_2$), said high power level selected within said asymptotic region, saving the DAC setting (DAC2) and the ADC setting (ADC2) at said $P_2$ power level, energizing said laser diode to produce said first power level ($P_1$), establishing an in focus condition on said target surface, saving the DAC setting (DAC3) and the ADC setting (ADC3) at said $P_1$ power level for said in focus condition, determining the change in DAC value ($\Delta DAC1$) required to change laser drive current from in focus power level $P_1$ to out of focus power level $P_1$ utilizing the relationship $$\Delta DAC1 = (DAC2 - DAC1)\frac{(ADC1 - ADC3)}{(ADC2 - ADC1)},$$

determining the DAC transfer function E utilizing the relationship $$E = \frac{P_2 - P_1}{(DAC2 - DAC1) + \Delta DAC1}, \text{ and}$$

determining the DAC value, DACn, for any laser power level, P1p, utilizing the relationship, $$DACn = DAC3 + \frac{(P1p - P_1)}{E}$$

whereby a DAC setting is calculated to produce a desired power level, P1p.

4. The method of claim 3 extended to include a determination of the proper operation of said semiconductor laser diode and said laser drive circuitry comprising the machine-implemented steps of:

obtaining the DAC transfer function, E, the increase in laser power output per DAC step and obtaining the laser efficiency, $G_d$, as a function of E, wherein successively greater digital values (DAC step) produce successively greater analog signal output, obtaining the ADC transfer function, n, the increase in laser power output per ADC step, and obtaining the laser efficiency, $G_a$, as a function of n, wherein successively greater analog input signals produce successively greater digital output signals (ADC steps), and comparing $G_d$ and $G_a$, and if equal and within a preset range of laser efficiency, indicating no fault.

5. The method of claim 4 wherein the result of the comparison of $G_d$ and $G_a$ is equal but outside a preset range of laser efficiency, indicating a first fault, said first fault being an indication of a faulty laser diode.

6. The method of claim 4 wherein the result of the comparison of $G_d$ and $G_a$ is not equal, indicating a second fault, said second fault being an indication of a faulty laser driver.

7. The method of claim 4 further including the steps of comparing said ADC transfer function to said DAC transfer function against a preset range of ADC/DAC ratios, and indicating faulty circuitry if the results of said comparison fall outside said preset range of ratios.

8. A method for calibrating apparatus employing semiconductor laser diodes subject to reflective optical feedback from a target surface wherein the power output vs. drive current characteristic curves for the laser diode exhibit an asymptotic region for in focus and out of focus conditions at high power levels, and wherein said apparatus includes laser drive circuitry with a digital to analog converter (DAC) for setting drive current levels and an analog to digital converter (ADC) for measuring drive current levels, said method comprising the machine-implemented steps of:

establishing an out of focus condition on said target surface, energizing said laser diode to produce a predetermined first low laser power level ($P_1$), saving the DAC setting (DAC1) and the ADC setting (ADC1) at said $P_1$ power level for said out of focus condition, energizing said laser diode to produce a predetermined high laser power level ($P_2$), said high power level selected within said asymptotic region, saving the DAC setting (DAC2) and the ADC setting (ADC2) at said $P_2$ power level, energizing said laser diode to produce said first power level ($P_1$), establishing an in focus condition on said target surface, saving the DAC setting (DAC3) and the ADC setting (ADC3) at said $P_1$ power level for said in focus condition, adjusting said apparatus such that power level $P_1$ is equal to a threshold power level P0 at which lasing mode is achieved, and where said DAC is adjusted to a setting of zero at said $P_1$ level, determining the changes in DAC value ($\Delta DAC1$) required to change laser drive current from in focus power level $P_1$ to out of focus power level $P_1$ utilizing the relationship $$\Delta DAC1 = \Delta DAC2 \frac{(ADC1 - ADC3)}{(ADC2 - ADC1)},$$

determining the DAC transfer function E utilizing the relationship $$E = \frac{P_2 - P_1}{\Delta DAC2 + \Delta DAC1}, \text{ and}$$

determining the DAC value, DACn, for any laser power level, P1p, utilizing the relationship $$DACn = \frac{P1p - P_1}{E},$$

whereby a DAC setting is calculated to produce a desired power level, P1p.

9. A method for calibrating apparatus employing semiconductor laser diodes subject to reflective optical feedback from a target surface wherein the power output vs. drive current characteristic curves for the laser diode exhibit an asymptotic region for in focus and out of focus conditions at high power levels, wherein said apparatus includes a digital to analog converter (DAC) for setting drive current levels, said method including the steps of:

establishing an out of focus condition on said target surface, energizing said laser diode to produce a predetermined low power level ($P_1$) and saving the DAC setting (DAC1), energizing said laser diode to produce a predetermined high power level ($P_{12}$), said high power level selected within said asymptotic region, saving the DAC setting (DAC2) at said $P_2$ power level, energizing said laser diode to produce said first power level $P_1$, establishing an in focus condition on said target surface, saving the DAC setting (DAC3) at said $P_1$ power level for said in focus condition, determining the change in DAC value ($\Delta DAC1$) to change laser drive current from in focus power level $P_1$ to out of focus power level $P_1$ utilizing the relationship $$\Delta DAC1 = DAC2 - DAC1,$$

determining the change in DAC value ($\Delta DAC2$) to change laser drive current from high power level $P_2$ to low power level $P_1$ at out of focus conditions utilizing the relationship $$\Delta DAC2 = DAC3 - DAC1,$$

determining the DAC transfer function E utilizing the relationship $$E = \frac{P_2 - P_1}{\Delta DAC1 + \Delta DAC2}, \text{ and}$$

determining the DAC value, DACn, for any laser power level, P1p, utilizing the relationship $$DACn = DAC3 + \frac{P1p - P_1}{E}$$

whereby a DAC setting is calculated to produce a desired power level, P1p.

10. Optical disk apparatus wherein a semiconductor laser diode emits radiation which is directed through a lens to the surface of an optical disk and wherein said laser received an optical feedback radiation reflected form said surface, said apparatus including means for calibrating the drive current of said laser diode, said apparatus comprising:

a laser diode and an associated lens for receiving radiation therefrom, actuating means connected to said lens for moving said lens to an in focus condition from an out of focus condition for directing radiation produced by said diode to said surface, laser drive current means connected to said laser diode, laser drive current control means connected to said drive current means for energizing said diode to selected power levels, $P_1$ and $P_2$, where $P_1$ is a low power level and $P_2$ is a high power level, microprocessor means, means connected to said laser diode for measuring laser drive current levels I1, I2 and I3 wherein $I_1$ is the drive current for producing power level $P_1$ at an out of focus condition, $I_2$ is the drive current for producing power level $P_2$ at an out of focus condition, and $I_3$ is the drive current for producing power level $P_1$ at an in focus condition, and said microprocessor means connected to said means for measuring and to said laser drive current control means, for calculating the slope of said power vs. current characteristic curve for in focus condition utilizing the relationship $$\frac{P_2 - P_1}{I_2 - I_3},$$

whereby the current value needed for establishing a desired power level between $P_1$ and $P_2$ can be calculated.

11. The optical disk apparatus of claim 10 further including means connected to said microprocessor means and optically coupled to receive a portion of said radiation for measuring the output power of said laser diode for establishing said selected power levels.

12. The apparatus of claim 11 wherein said laser drive current control means includes a digital to analog converter (DAC), means for establishing DAC value settings DAC1, DAC2, and DAC3, where DAC1 is the setting for producing power level $P_1$ at out of focus condition, DAC3 is the setting for producing power level $P_1$ at in focus condition, and where DAC2 is the setting for producing power level $P_2$ at an out of focus condition, said means for measuring laser drive current levels includes an analog to digital converter (ADC) connected to said laser drive current control means and to said microprocessor, wherein ADC1, ADC2, and ADC3 are corresponding digital values for measured current levels I1, I2, and I3, said microprocessor means for determining the change in DAC value ($\Delta DAC1$) required to change laser drive current from in focus power level $P_1$ to out of focus power level $P_1$ utilizing the relationship $$\Delta DAC1 = (DAC2 - DAC1)\frac{(ADC1 - ADC3)}{(ADC2 - ADC1)},$$

for determining the DAC transfer function E utilizing the relationship $$E = \frac{P_2 - P_1}{(DAC2 - DAC1) + \Delta DAC1},$$

and for determining the DAC value, DACn, for any laser power level, P1p, utilizing the relationship, $$DACn = DAC3 + \frac{(Plp - P_1)}{E}.$$

13. Optical disk apparatus wherein a semiconductor laser diode emits radiation which is directed through a lens to the surface of an optical disk and wherein said laser receives an optical feedback radiation reflected from said surface, said apparatus including means for calibrating the drive current of said laser diode, said apparatus comprising:

a laser diode and an associated lens to receive radiation therefrom, actuating means connected to said lens for moving said lens to an in focus condition from an out of focus condition for directing radiation produced by said diode to said surface, laser drive current means connected to said laser diode, laser drive current control means connected to said laser drive current means for energizing said diode to selected power levels, $P_1$ and $P_2$, where $P_1$ is a low power level and $P_2$ is a high power level, said control means including a digital to analog convertor (DAC) for establishing DAC value settings DAC1, DAC2, and DAC3, where DAC1 is the setting for producing power level $P_1$ at an out of focus condition, DAC3 is the setting for producing power level P1 at an in focus condition, and DAC2 is the setting for producing power level $P_2$ at an out of focus condition, microprocessor means, means connected to said microprocessor means and optically coupled to receive a portion of said radiation for measuring the output power of said laser diode for establishing said selected power levels, said microprocessor means connected to said DAC for determining the change in DAC value ($\Delta DAC1$) required to change laser drive current form in focus power level $P_1$ to out of focus power level $P_1$ utilizing the relationship $$\Delta DAC1 = DAC2 - DAC1,$$

said microprocessor means for determining the change in DAC value (66 DAC2) to change laser drive current from high power level $P_2$ to low power level $P_1$ at out of focus conditions, utilizing the relationship $$\Delta DAC2 = DAC3 - DAC1,$$

said microprocessor means for determining the DAC transfer function, E, utilizing the relationship $$E = \frac{P_2 - P_1}{\Delta DAC1 + \Delta DAC2}, \text{ and}$$

said microprocessor means for determining the DACn setting for a desired laser power level P1p according to the relationship $$DACn = DAC3 + \frac{(Plp - P_1)}{E}.$$

14. A method of determining the proper operation of a laser diode and its drive circuitry, wherein laser drive circuitry includes a digital to analog converter (DAC) for setting drive current levels wherein successively greater digital values (DAC steps) produce successively greater analog signal output, and wherein said circuitry includes an analog to digital converter (ADC) for measuring drive current levels wherein successively greater analog input signals produce successively greater digital output values (ADC steps), said method comprising the machine-implemented steps of:

obtaining the DAC transfer function, E, the increase in laser power output per DAC step, and obtaining the laser efficiency $G_d$ as a function of E, obtaining the ADC transfer function, n, the increase in laser power output per ADC step, and obtaining the laser efficiency $G_a$ as a function of n, and comparing $G_d$ and $G_a$, and if equal and within a preset range of laser efficiency, indicating no fault.

15. The method of claim 14 wherein the result of the comparison of $G_d$ and $G_a$ is equal but outside a preset range of laser efficiency, indicating a first fault, said first fault being an indication of a faulty laser diode.

16. The method of claim 14 wherein the result of the comparison of $G_d$ and $G_a$ is not equal, indicating a second fault, said second fault being an indication of a faulty laser driver.

17. The method of claim 14 further including the steps of comparing said ADC transfer function to said DAC transfer function against a preset range of ADC-/DAC ratios, and indicating faulty circuitry if the results of said comparison fall outside said preset range of ratios.

* * * * *